US009139298B2

United States Patent
Gates et al.

(10) Patent No.: US 9,139,298 B2
(45) Date of Patent: Sep. 22, 2015

(54) ROTORCRAFT CONTROL SYSTEM FOR ROTORCRAFT WITH TWO OR MORE ROTOR SYSTEMS

(71) Applicants: Alfred Alan Gates, Moodus, CT (US); Fu-Shang John Wei, Windsor, CT (US)

(72) Inventors: Alfred Alan Gates, Moodus, CT (US); Fu-Shang John Wei, Windsor, CT (US)

(*) Notice: Subject to any disclaimer, the term of this patent is extended or adjusted under 35 U.S.C. 154(b) by 174 days.

(21) Appl. No.: 13/956,783

(22) Filed: Aug. 1, 2013

(65) Prior Publication Data

US 2015/0037149 A1 Feb. 5, 2015

(51) Int. Cl.
*B64C 27/467* (2006.01)
*B64C 27/615* (2006.01)
*B64C 27/08* (2006.01)
*B64C 27/20* (2006.01)

(52) U.S. Cl.
CPC ............... *B64C 27/615* (2013.01); *B64C 27/08* (2013.01); *B64C 27/20* (2013.01)

(58) Field of Classification Search
CPC .................. B64C 27/615; B64C 2027/7261; B64C 2027/7266; B64C 27/001; B64C 2027/002; B64C 2027/003; B64C 2027/004
See application file for complete search history.

(56) References Cited

U.S. PATENT DOCUMENTS 7,644,887 B2 * 1/2010 Johnson et al. ............ 244/17.19
7,841,829 B2 * 11/2010 Schmaling et al. ............... 416/1

FOREIGN PATENT DOCUMENTS

GB 626690 A * 7/1949

* cited by examiner

*Primary Examiner* — Brian M O'Hara

(57) ABSTRACT

A multirotor rotorcraft control system for effectuating flight control. The multirotor rotorcraft has at least two or more rotor assemblies. The control system preferably includes at least one flap for each rotor blade and at least one actuator for each rotor assembly. The rotor assemblies and the flap(s) and actuator(s) for each assembly are used for flight control. This invention does not require a complex fixed pitch control system or a high frequency servo control system. This invention can control blade angle of attack during autorotation.

9 Claims, 4 Drawing Sheets

500
ROTORCRAFT CONTROL SYSTEM FOR ROTORCRAFT WITH TWO OR MORE ROTOR SYSTEMS

CROSS REFERENCE TO RELATED APPLICATION

Background of the Invention

1. Field of the Invention

The present disclosure relates to multirotor rotorcraft control systems for multirotor rotorcraft having two or more rotor assemblies. More specifically, the present disclosure relates to multirotor rotorcraft control systems in which flaps are used to control the rotor blades' angle of attack. The flaps can be servo flaps, trailing edge flap, leading edge flap or any combination of these. Herein, flap or flaps will be assumed to be any one flap or combination of the above flaps working in concert. Trailing edge flaps will be used to describe the invention.

2. Description of Related Art

Rotorcraft, such as, but not limited to, helicopters, have included control systems using a swashplate for effectuating flight control of the rotorcraft. The swashplate control system has several deficiencies, including large drag forces which significantly reduce energy efficiency, complex mechanical and/or hydraulic systems for control and costly maintenance.

Trailing-edge flaps have been used in the prior art for purposes of primary flight control of multirotor rotorcraft. These flaps have typically been controlled using a swashplate.

Thus, prior art multirotor rotorcraft have required a control system: a swashplate system for primary flight control. This prior art control system is costly and complex.

Some multirotor rotorcraft use fixed pitch propellers for rotors for primary flight control. A multirotor rotorcraft with four rotor assemblies is commonly called a quad rotor and used as a drone aircraft, i.e., an aircraft that is controlled remotely or by programming. A typical quad rotor incorporates fixed pitch propellers without swashplates. Flight is controlled by changing the revolutions per minute, RPM, of the rotor assemblies. The rotor assembly can be powered by a motor with or without a gear set and a propeller similar to airplane engine gears and propeller. If there is an inflight power failure, quad rotor aircraft are unable to perform autorotation, which is a controlled descent to a safe landing. Rotorcraft, helicopters and gyroplanes all have this capability. In the past, manned quad rotor and multirotor assembly rotorcraft have been developed with swashplates and have been very complex to build and control. This also applies to any multirotor rotorcraft.

Prior art also includes a complex swashplateless rotorcraft control system which requires a primary control and higher harmonic control systems. A key drawback is an actuator working in the high frequency environment. Present actuator technology with harmonic control is not mature enough for rotorcraft cyclic and harmonic rotor blade control.

Prior art also includes a complex swashplateless rotorcraft control system, which requires complex actuators that have been recently disclosed. This system requires a primary flap and actuator control system and two secondary flap and actuator control systems to control a helicopter with one rotor assembly. This system requires a minimum of three flaps and actuators and is costly and complex. Also this system requires three flaps and actuators because it is acting as a swashplate such that it controls cyclic pitch and roll, and collective lift in a helicopter.

A tilt rotor aircraft that utilizes variable pitch propellers is not capable of effective autorotation. Also the controls for the variable pitch propellers are a complex system involving hydraulics, linkage, drive shafts and transmission components.

Accordingly, there is a need for multirotor rotorcraft control systems that overcome one or more of the aforementioned and other deficiencies of the prior art control systems.

BRIEF SUMMARY OF THE INVENTION

It is an object of the present invention to provide a swashplateless multirotor rotorcraft control system for a multirotor rotorcraft with two or more rotor assemblies.

It is another object of the present invention to provide a rotor blade control system that provides independent blade control of angle of attack for each rotor assembly.

It is yet another object of the present invention to provide a multirotor rotorcraft control system that optimizes the use of actuators.

These and other objects and advantages are achieved by the present invention. In one preferred embodiment, the present invention provides a multirotor rotorcraft having two or more rotor assemblies, with each rotor assembly comprising of at least two rotor blades, one actuator and a flap for each rotor blade. A flap provides a means of changing the rotor blade's angle of attack. Each rotor blade has a leading edge, a trailing edge, a chord length, a span and a flap, and/or, smart material within, to change the angle of attack. The actuator is preferably pivotally connected to the flap or smart material to provide a rotor blade's angle of attack movement among the neutral, positive and negative positions.

In an alternative preferred embodiment, a method of effectuating flight control of a multirotor rotorcraft having rotor assemblies including at least two rotor blades with a trailing edge or leading edge flap or smart material and/or any combination is also provided for each rotor assembly. The method includes rotating the rotor blade through an azimuth, moving a flap or smart material among a neutral position, a positive position, and a negative position to carry out flight control of the multirotor rotorcraft. The flight control system is operatively connected, preferably pivotally connected, to the trailing edge or leading edge flap or smart material and/or any combination of the rotor blade.

In another alternative preferred embodiment, there is at least two rotor blade for each rotor assembly, and for each rotor assembly there is at least one actuator that interfaces with and controls at least one flap for each rotor blade. The at least one actuator for each rotor assembly and the at least one flap for each rotor blade for each rotor assembly are used for flight control.

The above-described rotor assembly control for multirotor rotorcraft can perform a safe autorotation to landing. Current multirotor rotorcraft with fixed pitch propellors cannot perform autorotation.

The above-described rotor assembly control is simpler than a cyclic and collective control system in that it only provides collective control. Cyclic control is not required for multirotor rotorcraft having two or more rotor assemblies.

The above-described rotor assembly control is simpler than a cyclic and collective control system in that it only provides collective control. Harmonic control is not required for multirotor rotorcraft having two or more rotor assemblies.

The above-described and other features and advantages of the present disclosure will be appreciated and understood by those skilled in the art from the following detailed description, drawings, and appended claims.

DETAILED DESCRIPTION OF THE INVENTION

Figure 1:
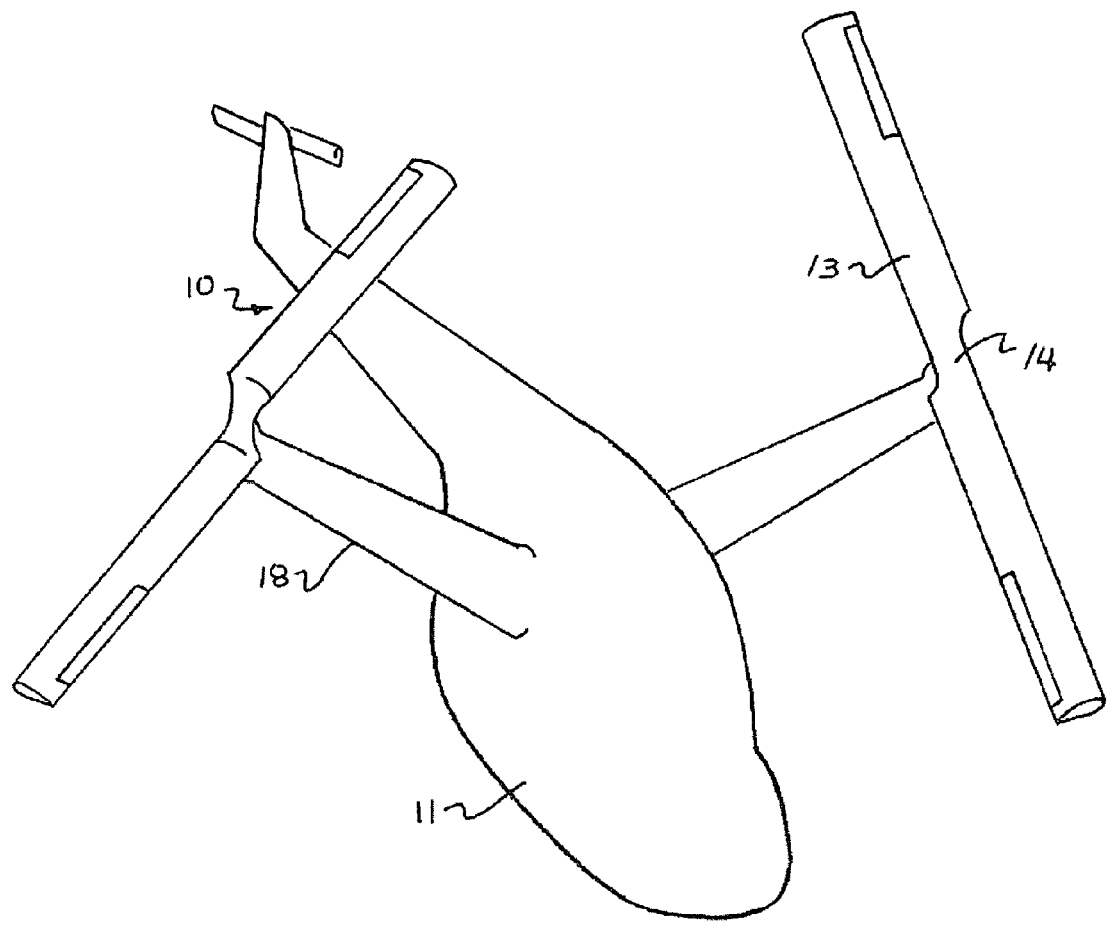
FIGS. 1 and 2 are a perspective view of an exemplary embodiment of two types of multirotor rotorcraft control systems according to the present disclosure.
Figure 2:
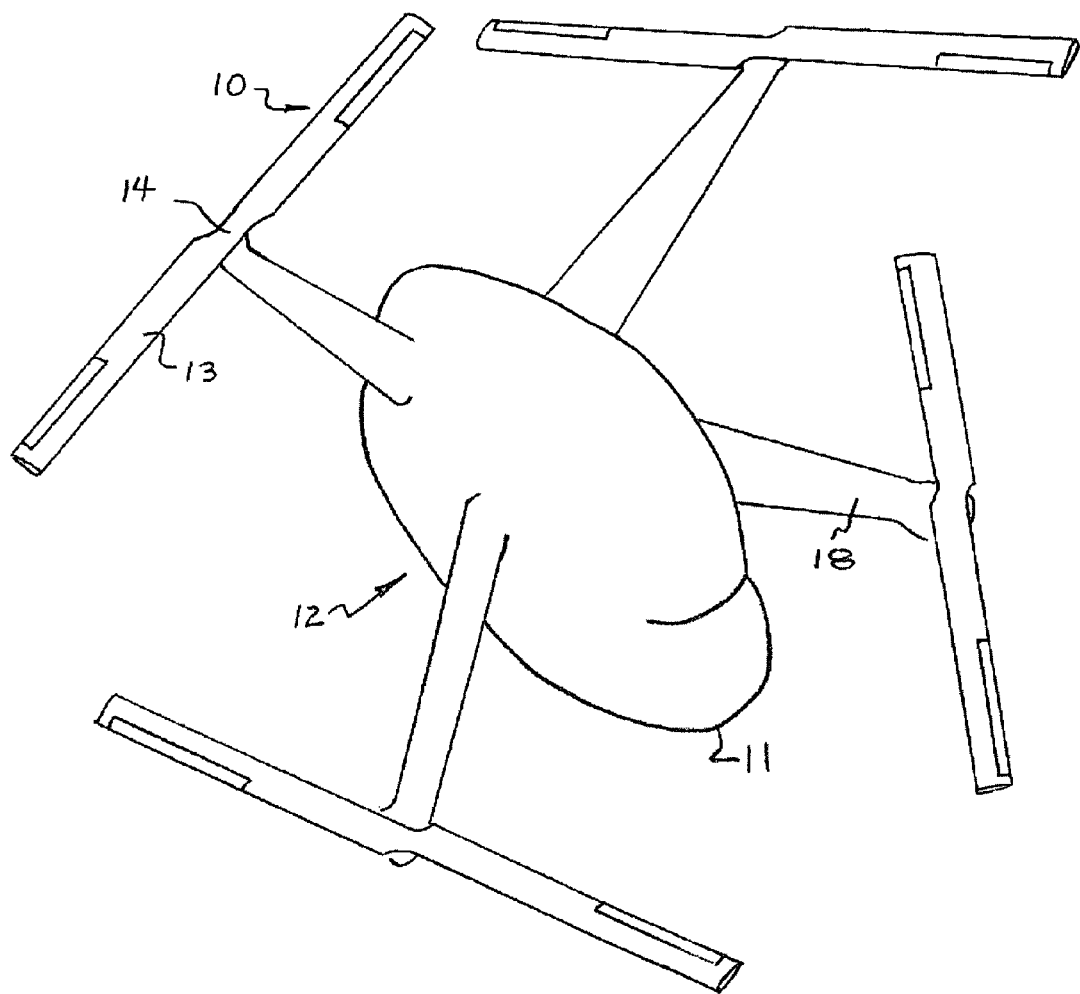

FIGS. 1 and 2 schematically illustrate an exemplary embodiment of a multirotor rotorcraft control system 10 connected to a rotorcraft body 11 (i.e., an airframe) according to the present disclosure. The multirotor rotorcraft body includes at least two rotor assemblies and supporting structure 10 and 18. The structure houses cable and/or drive shafts to turn the rotor blades. The blades can be powered by electric motors located at the end of the support frame to eliminate drive shafts. The electric motors can be battery powered and/or powered by a generator located on the airframe, support frames and/or a combination of these. The control system 10 includes a rotor assembly 14 and at least two or more blades 13 (two are shown). Advantageously, the control system 10 is configured such that the rotor assembly 14 does not include a swashplate as generally known in the prior art. Also, the rotor assembly does not include multiple flaps and actuators as described in a previous disclosure.

For the purpose of clarity, the control system 10 is illustrated in use with a two rotor assembly multirotor rotorcraft FIG. 1, and a four rotor assembly multirotor rotorcraft (known as a quad helicopter) FIG. 2. Additionally, it is to be understood that the control system can be used for multirotor rotorcraft having three rotor assemblies and more than four rotor assemblies. Additionally, it is to be understood that the control system of the present invention may be incorporated in other aircraft as well, such as for example, compound rotary-wing aircraft having a dual counter-rotating, coaxial rotor system; turbo-prop aircraft; tilt-rotor aircraft; tilt wing aircraft; and the like.

Traditionally, prior art rotorcraft have used a swashplate and its associated control linkage for flight control. Since the swashplate is generally exposed to the air, a large amount of hub drag is created. By incorporating the control system with the present invention, the swashplate is eliminated. This in turn significantly reduces hub drag, thus increasing the rotorcraft's fuel efficiency.

Moreover, in traditional multirotor rotorcraft, the swashplates and associated components, such as hydraulic actuators and control linkages, may constitute about 3.5% times the number of rotor assemblies of the weight of the multirotor rotorcraft. Since the control system 10 of the present invention eliminates the need for these elements, the control system 10 also reduces the weight of the multirotor rotorcraft. The decrease in weight due to the control system 10 allows the multirotor rotorcraft, for example, to carry more fuel, which in turn increases the range of the multirotor rotorcraft by approximately 14% times the number of rotor assemblies or increases the payload capabilities of the multirotor rotorcraft while maintaining the same range capabilities.

Moreover, a recent disclosure proposed a swashplateless control system consisting of three flaps and three actuators for primary flight control and harmonic control. But the invention proposed in this application is superior to this three-flap and three-actuator disclosure. First, the proposed invention requires only one flap and one actuator for multirotor rotorcraft having two or more rotor assemblies, rather than three flaps and three actuators as in the other disclosure. Second, the present invention costs significantly less than the three-flap and three-actuator disclosure. Third, the proposed invention can use prior art actuators in the control system, and thus can be implemented very quickly. In contrast, the three-flap and three-actuator disclosure requires high speed actuators compared with prior art actuators and as a result will be both costly and time-intensive to develop.

In addition, since the control system 10 only requires flap control, and no harmonic control is required, it eliminates the need for vibration reduction required for single rotor rotorcraft. As a result, the weight savings available through the use of the control system 10 can increase the payload capabilities by approximately an additional 7% times the number of rotor assemblies of the multirotor rotorcraft while maintaining the same range capabilities.

The control system 10 can be a servo flap, trailing edge flap, leading edge flap or combination of these flaps. The purpose of these flaps is to control the rotor blade angle of attack. It can be used to fly a multirotor rotorcraft with two or more rotor assemblies. The flight control system can independently change the angle of attack of the rotor assemblies, which can be used to control the multirotor rotorcraft direction of flight through differential thrust and torque control of the rotor assemblies. This control system is a significantly simpler design, having a maximum of one third the number of parts as a previous swashplateless disclosure. This control system will also require a significantly simpler actuator control system than a previous swashplateless disclosure. This control system provides positive, neutral and negative movement of the flap system to control a rotor blade's angle of attack, unlike a previous swashplateless disclosure where some of the flaps are limited to a neutral and positive or negative movement, but not both, due to the complexity of the previous swashplateless disclosure.

In addition, the control system 10 can be operated such that a multirotor rotorcraft can perform an autorotation. This is not possible with multirotor rotorcraft that use fixed pitch propellers.

Figure 3:
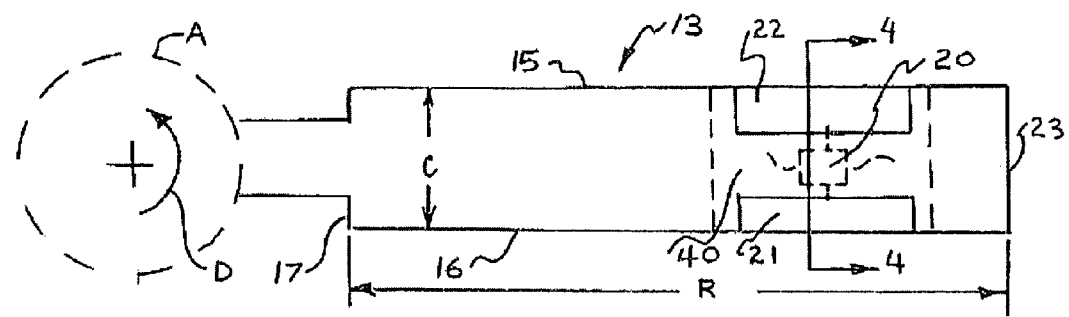
FIG. 3 is a top view of one rotor blade of FIG. 1 or 2.

The operation of control system 10 is described with references to FIGS. 3 and 4. As shown, the rotor blade 13 has a leading edge 15, a trailing edge 16, a root end 17, and a tip 23. The leading edge 15 is the forward-facing edge of the rotor blade 13 as the rotor blade rotates through azimuth A in direction of rotation D, while trailing edge 16 is the rear-facing edge of the rotor blade 13 as the rotor blade rotates through azimuth A. The rotor blade 13 also has a chord length c, which is defined as the distance between the leading edge 15 and trailing edge 16 as shown in FIG. 3. The rotor blade 13 also has a span R, which is defined as the distance between the root end 17 and the tip 23.

Figure 4A:
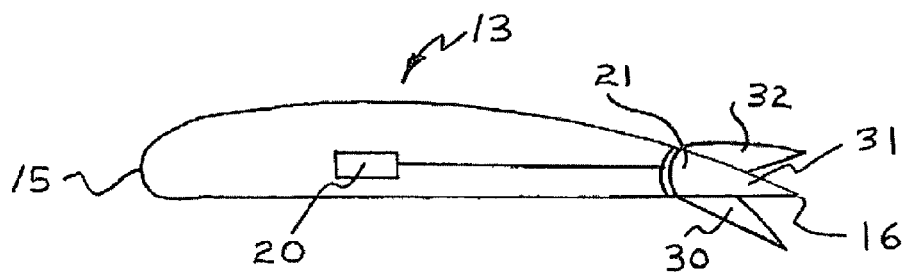
FIG. 4A is a cross-sectional view of the rotor blade of FIG. 3 taken along lines 4-4 showing a trailing edge flap in a neutral, positive and negative position.

Each trailing edge flap 21 can be rotated from a neutral position to either a positive or a negative position. As used herein, the neutral position, 31, is defined as a position where the trailing-edge of the flap is substantially parallel to the trailing edge 16 of the rotor blade (FIG. 4A), the positive position is defined as a position where the trailing edge of the flap is above the trailing edge 16 of the rotor blade position 32 (FIG. 4A), and the negative position is defined as a position where the trailing edge of the flap is below the trailing edge 16 of the rotor blade position 30 (FIG. 4A).

Figure 4B:
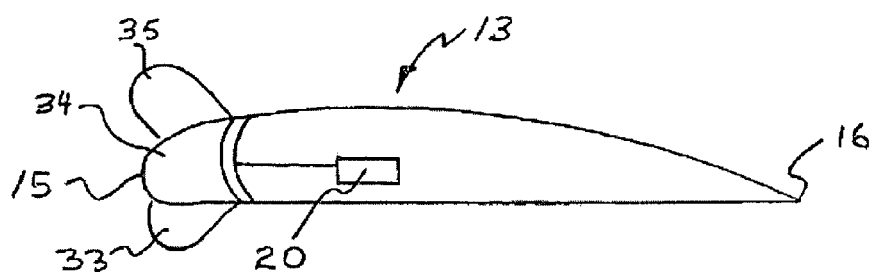
FIG. 4B is a cross-sectional view of the rotor blade of FIG. 3 taken along lines 4-4 showing a leading edge flap in a neutral, positive and negative position.

Each leading edge flap 22 can be rotated from a neutral position to either a positive or a negative position. As used herein, the neutral position, 34, is defined as a position where the leading-edge of the flap is substantially parallel to the leading edge 15 of the rotor blade (FIG. 4B), the positive position is defined as a position where the leading edge of the flap is above the leading edge 15 of the rotor blade position 35 (FIG. 4B), and the negative position is defined as a position where the leading edge of the flap is below the leading edge 15 of the rotor blade position 33 (FIG. 4B).

Figure 4C:
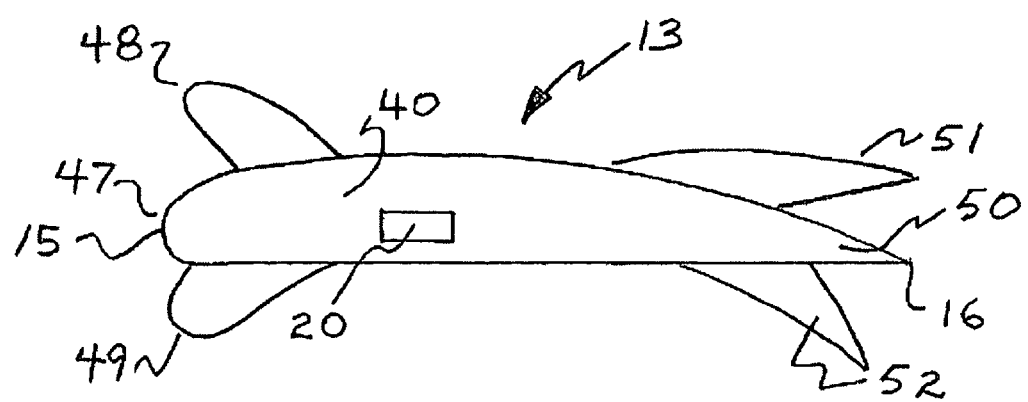
FIG. 4C is a cross-sectional view of the rotor blade of FIG. 3 made of a smart material taken along lines 4-4 showing a leading edge and trailing edge capable of movement in a neutral, positive and negative position.

Each smart material rotor blade section 40 can rotate the leading edge 47, which can be rotated from a neutral position to either a positive or a negative position. As used herein, the neutral position is defined as a position where the leading-edge is substantially parallel to the rotor blade leading edge 15 (FIG. 4C), the positive position is defined as a position where the leading edge is above the rotor blade leading edge 15, of the rotor blade position 48 (FIG. 4C), and the negative position is defined as a position where the leading edge is below the rotor blade leading edge 15, of the rotor blade position 49 (FIG. 4C). Each smart material rotor blade section 40 can rotate the trailing edge 50, which can be rotated from a neutral position to either a positive or a negative position. As used herein, the neutral position, 50, is defined as a position where the trailing-edge is substantially parallel to the trailing edge 16, of the rotor blade position 50 (FIG. 4C), the positive position is defined as a position where the trailing edge is above the trailing edge 16, of the rotor blade position 51 (FIG. 4C), and the negative position is defined as a position where the trailing edge is below the trailing edge 16, of the rotor blade position 52 (FIG. 4C).

Each flap 21 and/or 22 and/or smart material 40 is operatively connected to an actuator 20 that interfaces with and controls the movement of the flap 21 and/or 22 and/or smart material 40. The actuator 20 can be any actuator, known in the art, having sufficient power density and bandwidth to move the trailing edge flap 21, as necessary, and/or leading edge flap 22, and/or smart material 40. Preferably, the actuator is an electromechanical actuator. In addition, each actuator 20 has sufficient stroke to move the flap 21 to positive and negative positions that are sufficient to provide flight control to the multirotor rotorcraft if the rotor blade has a trailing edge flap 21. Thus, the control system 14 can use the flap 21 to control the multirotor rotorcraft having two or more rotor assemblies.

The control of the multirotor rotorcraft can also be achieved through using the leading edge flap 22, trailing edge flap 21 and smart material 40 as described above individually, or any combination of the above.

The control system 14 can control the movement of the actuators in each of the rotor assembly in any known manner. For example, the control system 14 can control the movement of the actuators of the rotor assemblies in conjunction with the inputs from a pilot and/or from an automated control system to provide a controlled flight path.

FIG. 3 also shows the flaps 21, 22 and smart material 40 at an inboard position along span R that is closer to the tip 23 end than the root 17 end.

Each flap 21, 22 or smart material section 40, may vary in size; the length and width of each flap may be different for each rotor assembly. The length is defined as a percentage of the chord length c of the rotor blade 13; the width is defined as a percentage of the span R of the rotor blade 13.

The width of the trailing edge flap 21, leading edge flap 22 or smart materials section 40, preferably covers approximately 20% to 40% of span R of the rotor blade 13.

The trailing edge flap 21 can also be a servo flap, where the flap is located behind the rotor blade, currently used on many servo flap rotor helicopters.

The length of the trailing edge flap 21, leading edge flap 22, preferably covers approximately 10% to 30% of the chord length c of the rotor blade 13.

A method of operating the above-described multirotor rotorcraft system for multirotor rotorcraft having two or more rotor assemblies, as illustrated in FIGS. 1 through 4, will now be described. Each rotor assembly 10 will have two or more rotor blades 13 (two shown) rotating in direction D or in the opposite direction depending on the number of rotor assemblies and location of each rotor assembly within the multirotor configuration. As the rotor blades 13 rotate through an azimuth A, the flaps 21 are pivoted by actuators 20 so as to be positioned in the neutral, positive or negative positions, as necessary to control the flight path. Each rotor assembly will operate independently of the other rotor assemblies necessary to control the flight path of the rotorcraft. The control laws necessary for flight control of multirotor rotorcraft having two or more rotor assemblies will differ significantly for each configuration having a different number of rotor assemblies.

The trailing edge 21, the leading edge flap 22, or smart material section 40, or any combination of leading edge flap 22, trailing edge flap 21 and smart material section 40, can be applied in the same manner as stated above to achieve flight control.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present disclosure not be limited to the particular embodiment(s) disclosed as the best model contemplated, but that the disclosure will include all embodiments falling within the scope of the appended claims.

The invention claimed is:

1. A rotorcraft comprising:
   at least two rotor assemblies;
   at least two rotor blades per rotor assembly;
   each rotor blade further comprising at least one leading edge flap pivotally coupled to a leading edge of the rotor blade and at least one trailing edge flap pivotally coupled to a trailing edge of the rotor blade;
   at least one electromechanical actuator housed within a profile of each rotor blade;
   wherein each of said at least one electromechanical actuator is operably connected to one of said at least one leading edge flap with a first linkage and operably connected to one of said at least one trailing edge flap with a second linkage, each flap pivotable between a neutral position, a positive position and a negative position;
   wherein said rotorcraft is a transverse rotor rotorcraft, tricopter, quad helicopter, or a rotorcraft having more than four rotor assemblies.

2. The rotorcraft of claim 1, wherein pivoting the at least one leading edge flap and at least one trailing edge flap among the neutral, positive and negative positions changes aerodynamic lift of said at least two rotor assemblies resulting in mechanical torque acting on said rotorcraft allowing for flight control.

3. The rotorcraft of claim 2, further comprising a rotor assembly control system providing flight control by operating said at least two rotor assemblies at the same revolutions per minute or by operating said at least two rotor assemblies at different revolutions per minute.

4. The rotorcraft of claim 1, wherein each rotor blade includes an exterior aerodynamic housing for at least partially housing one of said at least one electromechanical actuator.

5. The rotorcraft of claim 1, wherein said first and second linkage comprise a control linkage or cable.

6. The rotorcraft of claim 1, wherein the at least one electromechanical actuator are prior art actuators.

7. The rotorcraft of claim 1, further comprising a rotor assembly control system which enables the rotorcraft to perform an autorotation maneuver in the event of an engine failure or any other type of event that requires an autorotation.

8. The rotorcraft of claim 1, wherein said at least two rotor assemblies are powered by electric motors, internal combustion engines or turbines.

9. A method for effectuating flight control of a multirotor rotorcraft comprising: providing:
   at least two rotor assemblies;
   at least two rotor blades per rotor assembly;
   each rotor blade further comprising at least one leading edge flap pivotally coupled to a leading edge of the rotor blade and at least one trailing edge flap pivotally coupled to a trailing edge of the rotor blade;
   at least one electromechanical actuator housed within a profile of each rotor blade;
   wherein each of said at least one electromechanical actuator is operably connected to one of said at least one leading edge flap with a first linkage and operably connected to one of said at least one trailing edge flap with a second linkage, each flap pivotable between a neutral position, a positive position and a negative position;
   wherein said rotorcraft is a transverse rotor rotorcraft, tricopter, quad helicopter, or a rotorcraft having more than four rotor assemblies; and
pivoting each of said at least one leading edge flap and trailing edge flap among the neutral, positive and negative positions to carry out flight control while the rotor blades are in motion.

\* \* \* \* \*